Figure 1:
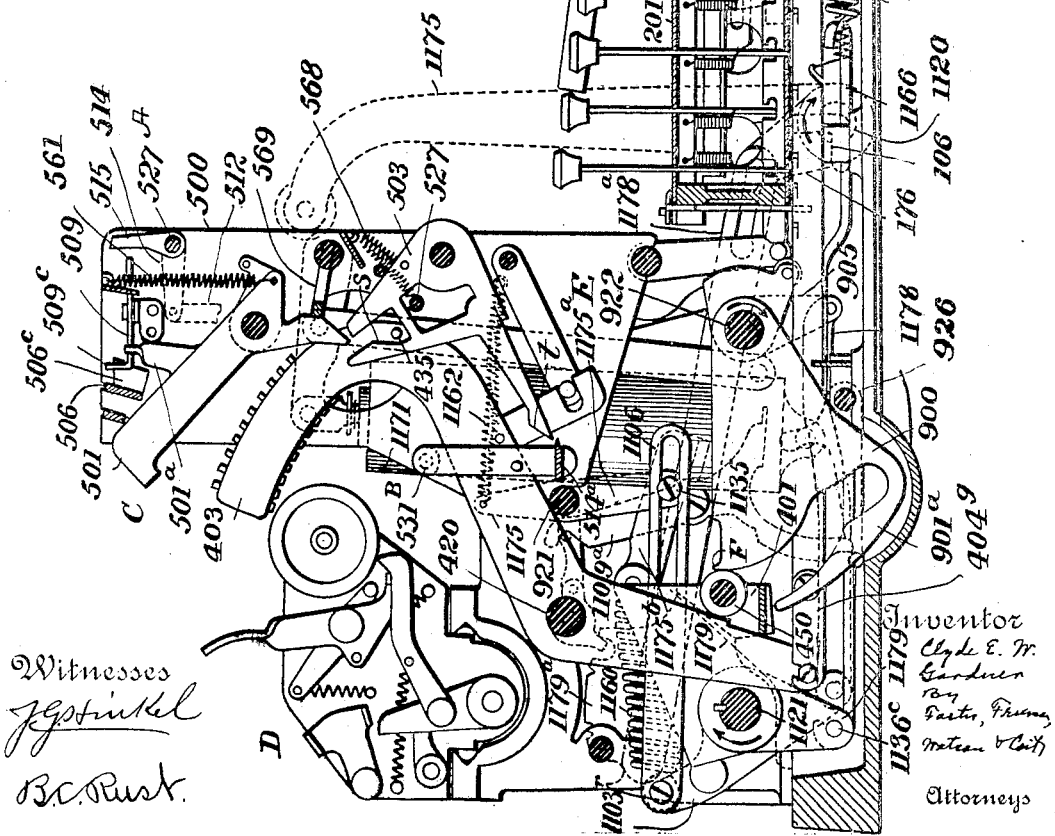

C. E. W. GARDNER.
ADDING MACHINE.
APPLICATION FILED NOV. 13, 1909.

1,121,822.

Patented Dec. 22, 1914.
9 SHEETS—SHEET 1.

Witnesses
J. G. Stinkel
B. C. Rust.

Inventor
Clyde E. W. Gardner
By Foster, Freeman,
Watson & Coit
Attorneys

C. E. W. GARDNER.
ADDING MACHINE.
APPLICATION FILED NOV. 13, 1909.
1,121,822.
Patented Dec. 22, 1914.
9 SHEETS—SHEET 2.
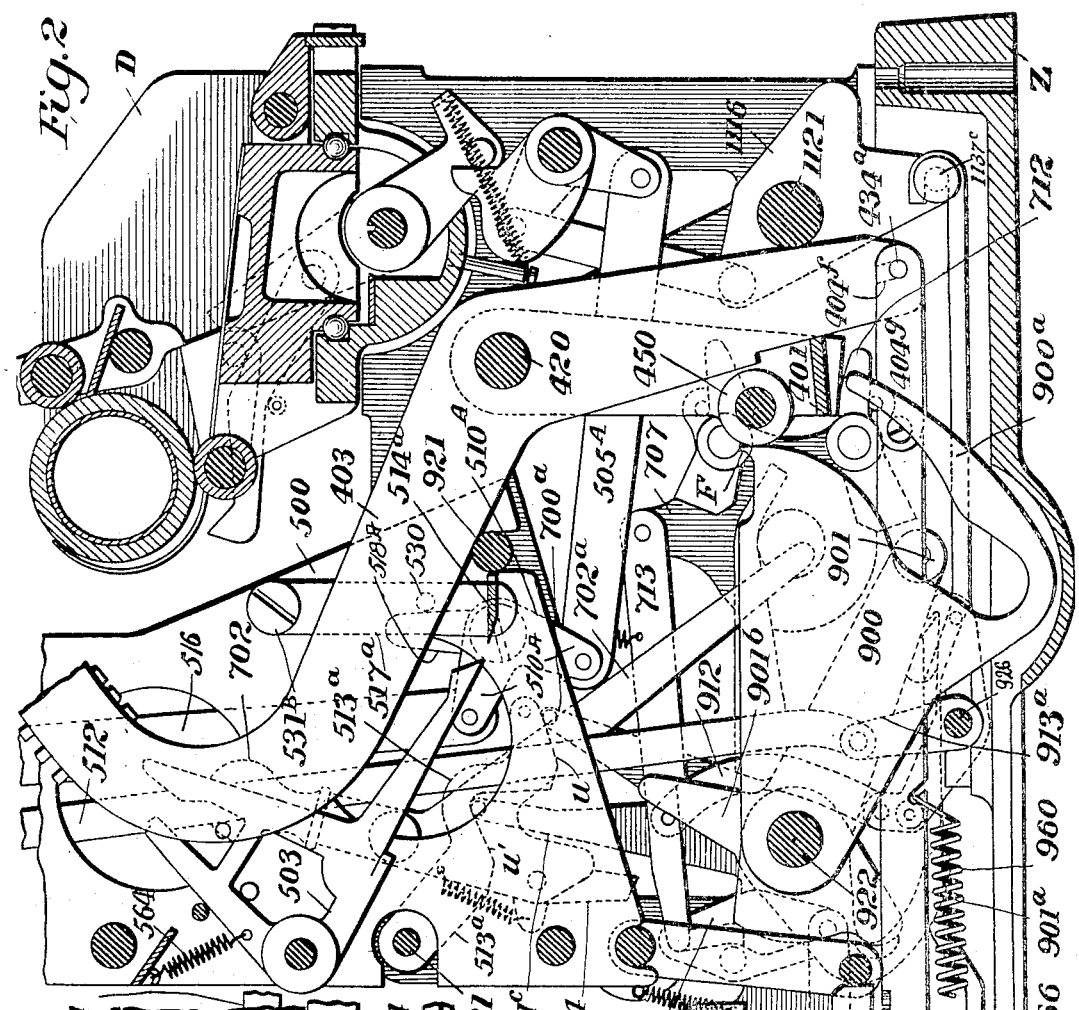
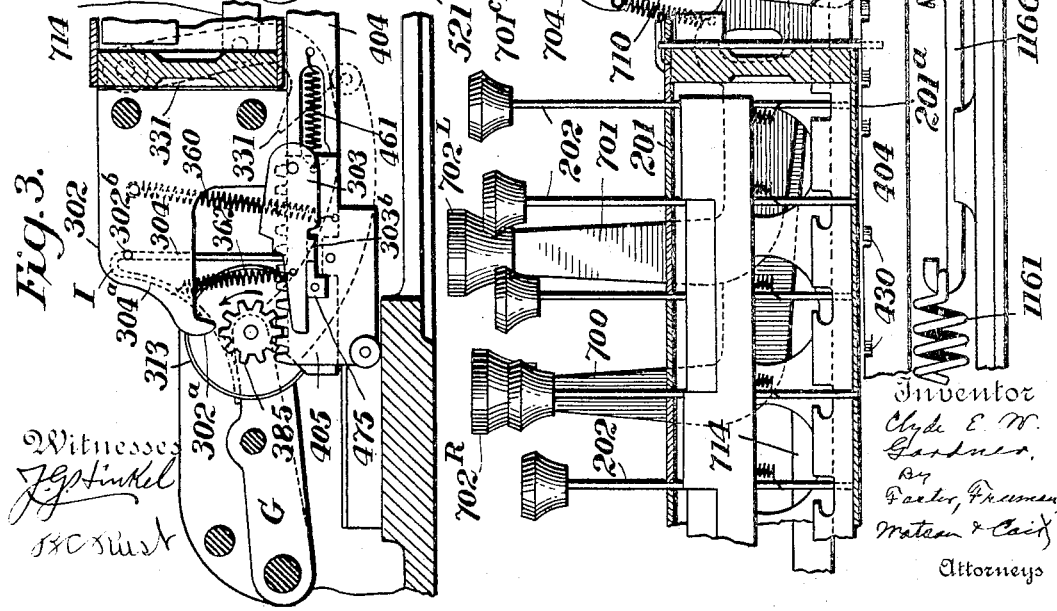

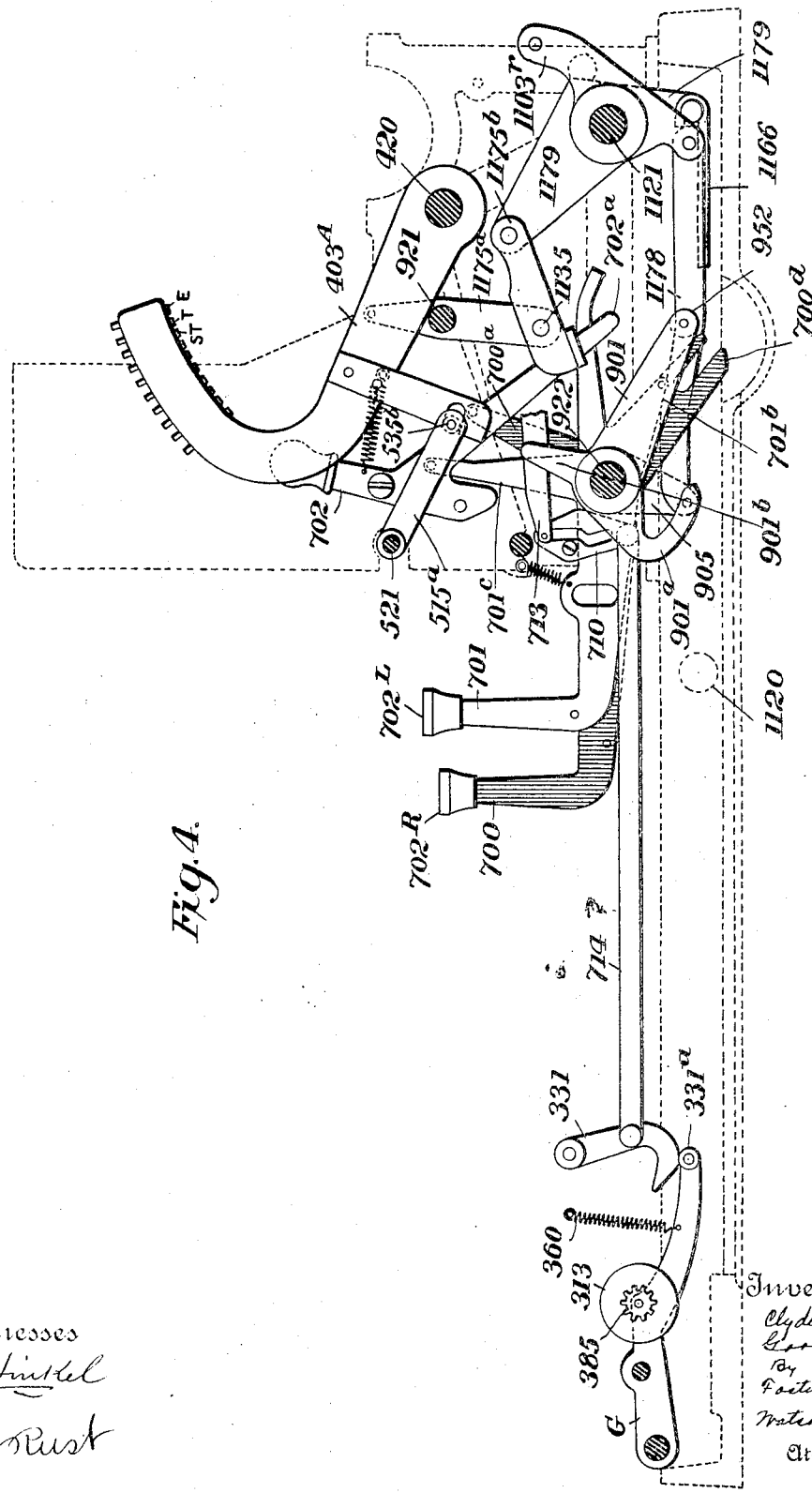

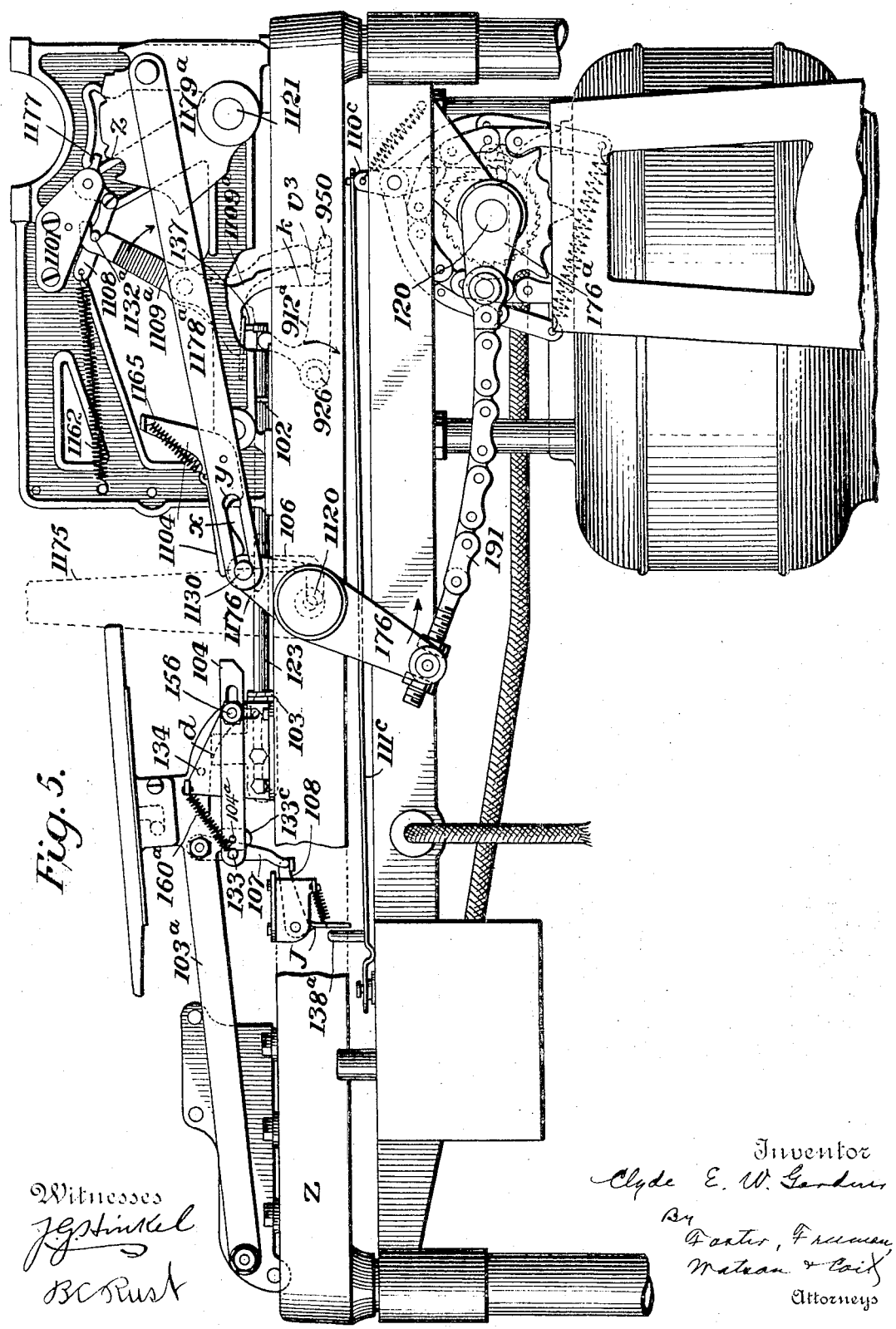

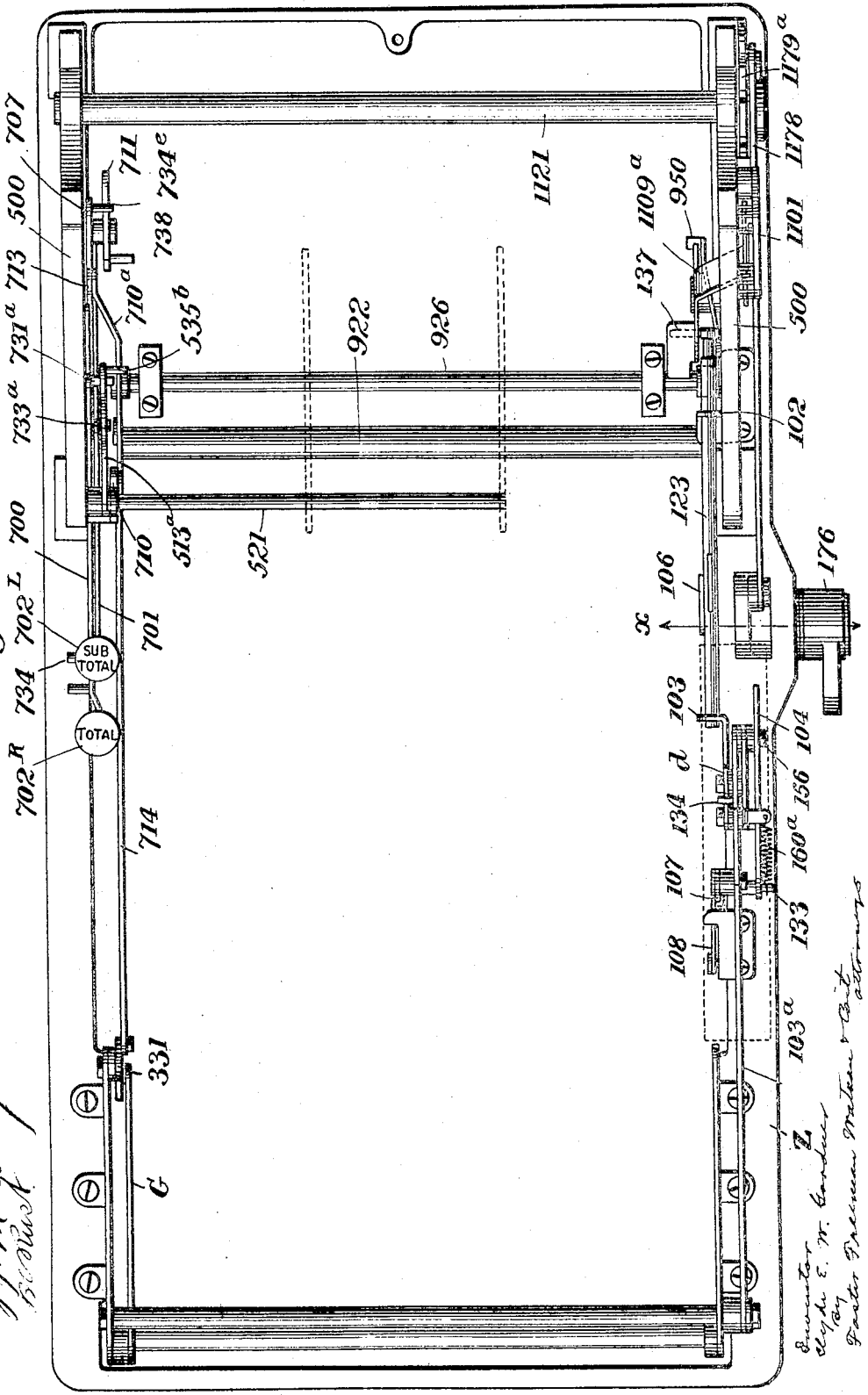

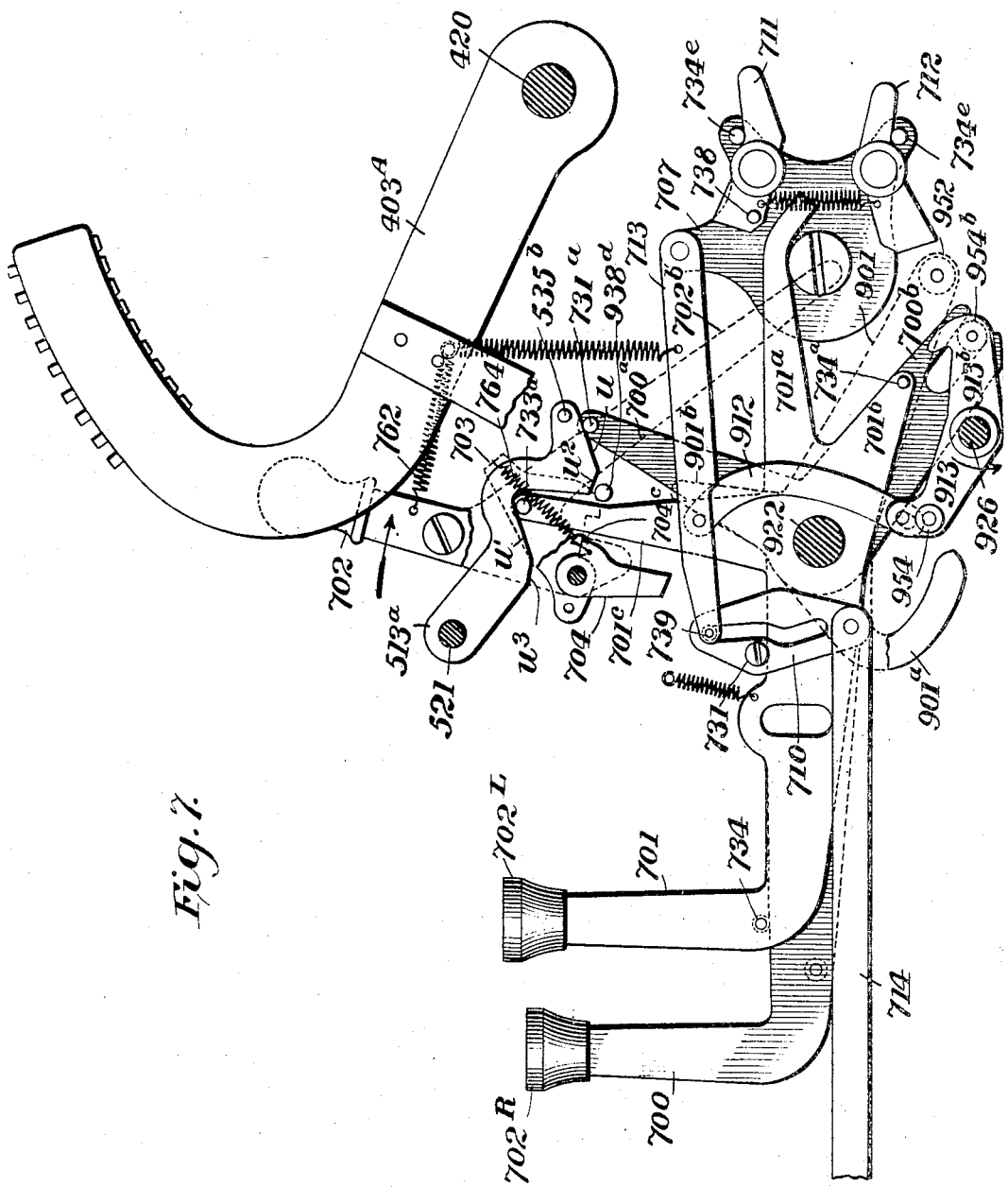

C. E. W. GARDNER.
ADDING MACHINE.
APPLICATION FILED NOV. 13, 1909.
1,121,822.  Patented Dec. 22, 1914.
9 SHEETS—SHEET 7.
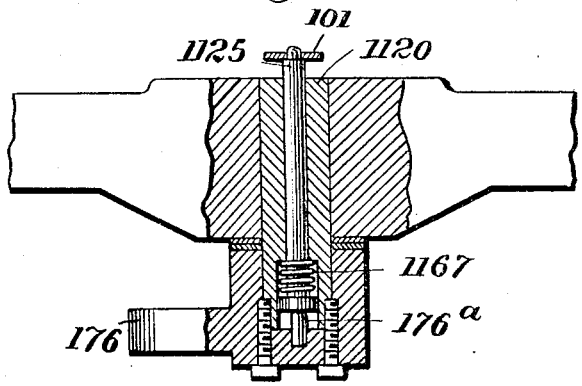
Fig. 8.
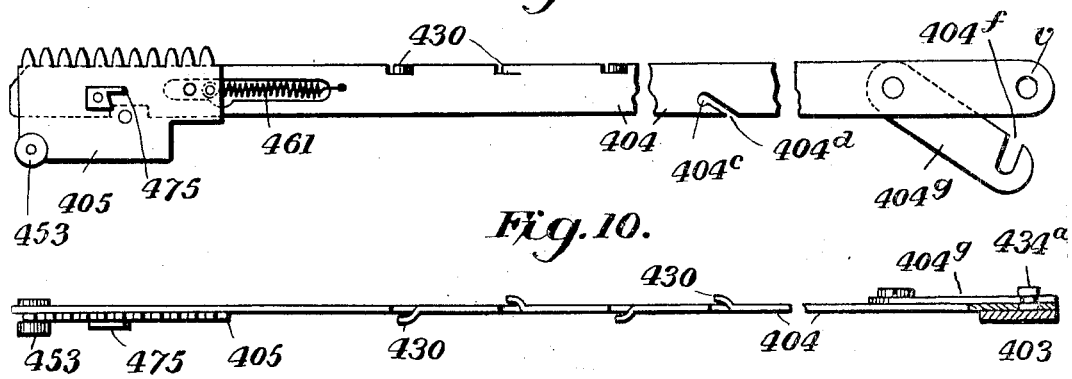
Fig. 9.
Fig. 10.
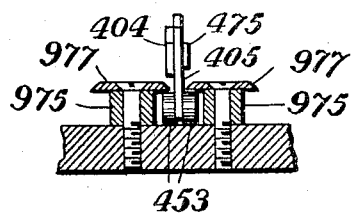
Fig. 11.
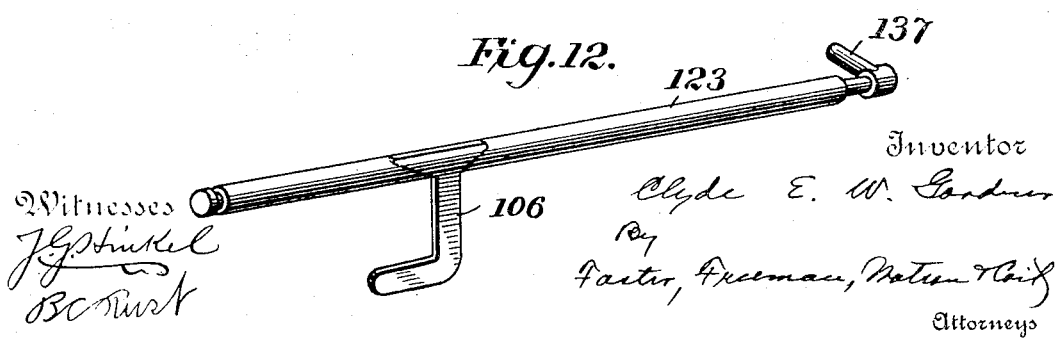
Fig. 12.
Witnesses
J. G. Hinkel
B. C. Rust
Inventor
Clyde E. W. Gardner
By
Foster, Freeman, Watson & Coit
Attorneys

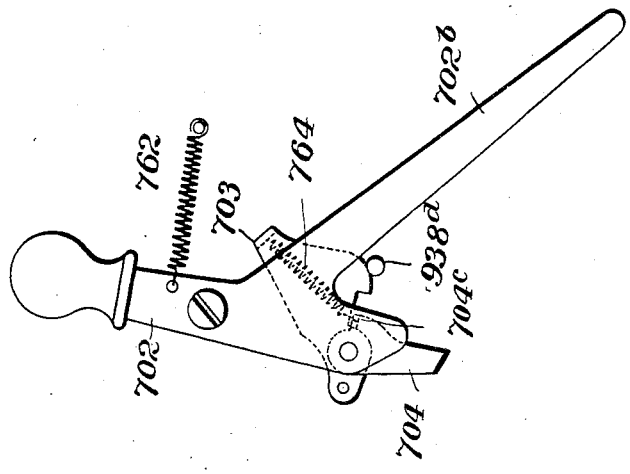
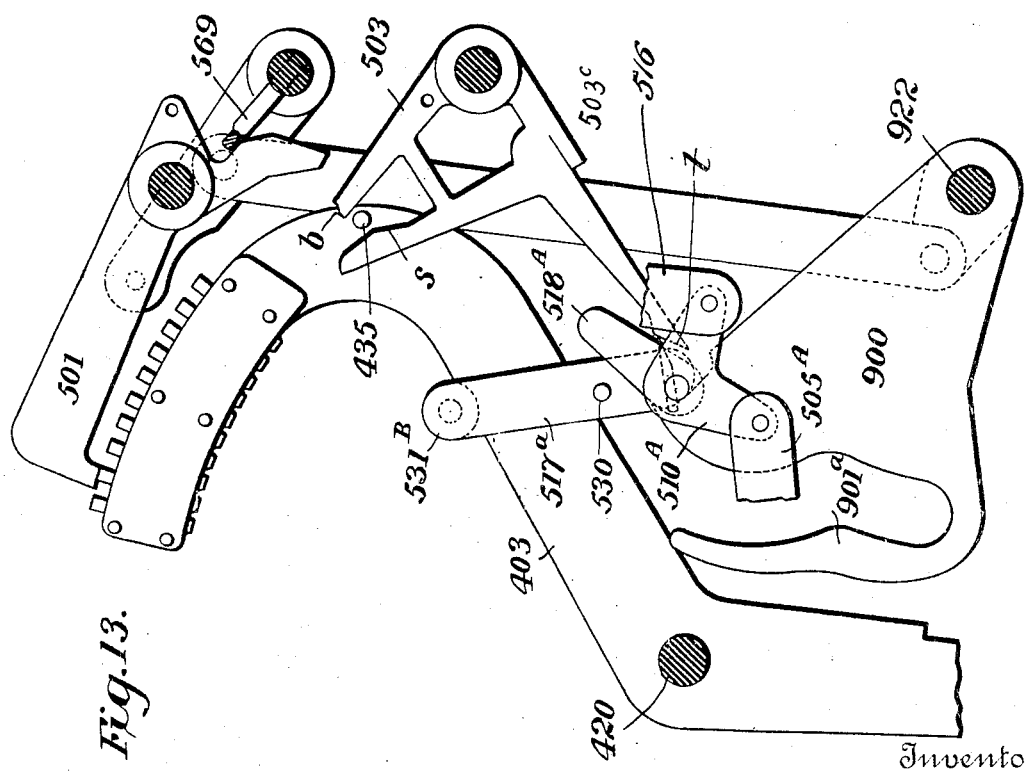

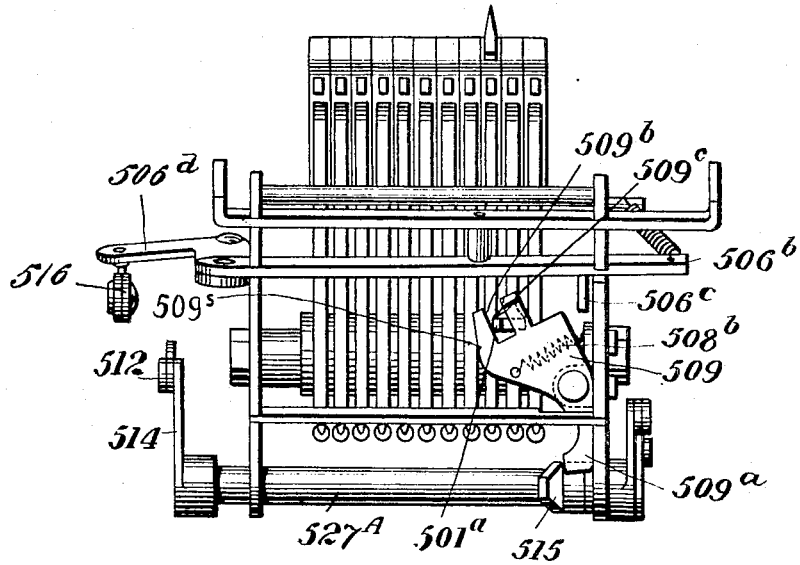
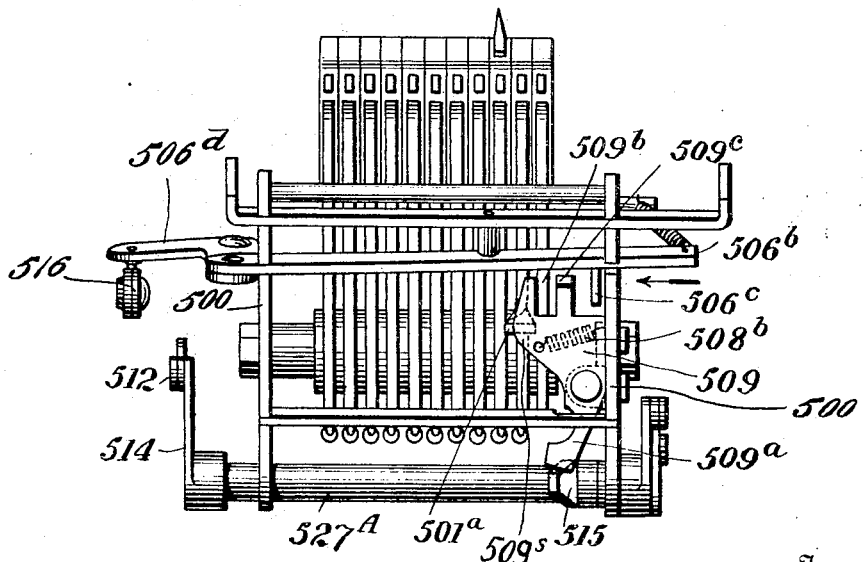

UNITED STATES PATENT OFFICE.

CLYDE E. W. GARDNER, OF DETROIT, MICHIGAN, ASSIGNOR, BY MESNE ASSIGNMENTS, TO BURROUGHS ADDING MACHINE COMPANY, OF DETROIT, MICHIGAN, A CORPORATION OF MICHIGAN.

ADDING-MACHINE.

1,121,822.  Specification of Letters Patent.  Patented Dec. 22, 1914.

Application filed November 13, 1909. Serial No. 527,785.

*To all whom it may concern:*

Be it known that I, CLYDE E. W. GARDNER, a citizen of the United States, and resident of Detroit, in the county of Wayne and State of Michigan, have invented certain new and useful Improvements in Adding-Machines, of which the following is a specification.

My invention relates to adding machines, and while some of my improvements are applicable to machines of different characters they are especially adapted, generally, to machines of the character illustrated in the Letters Patent to William H. Pike, Jr., Nos. 763,692 and 767,596, and have for their object to reduce the cost of construction, facilitate manipulation, prevent disarrangement and secure more accurate results, all as fully set forth hereinafter and illustrated in the accompanying drawing, in which:

Figure 1 is a longitudinal sectional elevation of a Pike adding machine embodying my improvements; Fig. 2 an enlarged longitudinal section of the rear part of the machine; Fig. 3 a like section at the front part of the machine; Fig. 4 a longitudinal elevation showing the parts more immediately associated with the total keys; Fig. 5 an external side view illustrating the parts more immediately associated with the means for connecting the machine with a motor arranged upon the stand; Fig. 6 is a plan view showing generally the parts associated with the total keys and the stopping and starting mechanism; Fig. 7 is an enlarged side view of the parts associated with the total keys and eliminating keys and indicator type; Fig. 8 is a sectional plan showing the connection between one of the crank arms and the actuating shaft; Figs. 9 to 12 are detail views of different parts; Fig. 13 is an enlarged view of the parts associated with the hammers and detents; Fig. 14 is a detached view of the parts more immediately associated with the eliminating key; Fig. 15 is an enlarged detail view of the parts associated with the lock plate; and Fig. 16 is a similar view showing the plate in a different position.

The machine comprises an accumulating or adding section A, Fig. 1, a key section B, a recording section C, a carriage section D, and an operating section E. All of these parts in their general construction and operation and in many of their details correspond to parts of the apparatus patented to Wm. H. Pike, Jr., and illustrated and described in his Letters Patent 763,692 and 767,596, and as far as possible in the description of the various improvements hereinafter specified I shall refer to parts of the improved device corresponding to those in the old device by the same reference numbers and letters as are used in the aforesaid Pike patents.

The machine is mounted upon a suitable base Z, the key-board 201 being upon one level, and the recording devices, including the sliding carriage, being supported at a higher level between side frames 500, as in the aforesaid Pike patent.

*The accumulating section.*—This comprises the number wheel frame G, Figs. 1, 3 and 4, which supports axially in row a series of peripherally numbered wheels 313, each having at one side a pinion 385 and at the other a cam 311, and the pinions are above a series of racks 405, each sliding to a limited extent upon a blade 404, and a spring 461 is connected with each rack and with its carrying blade, the said spring lying in a slot of the blade. The adder wheel frame G is lifted by side springs 360 and is depressed by a swinging cam arm 331 (Fig. 4) which derives its motion from a reciprocating blade 714, the inclined cam edge of said arm making contact with a roller 331$^a$ on the end of a projecting arm on the frame G, and when the said frame is in its upper position the pinions 385 are engaged by fingers 302$^a$ on partition plates 302, between which are pivotally supported pawls I (Fig. 3). Each of the pawls consists of a narrow strip of metal having side trunnions 302$^b$, which enter openings in the partition plates 302, said strips being bent to form two members 304 and 304$^a$. Each vertical member 304 rests at its lower end upon a detent 303, which has a side lip 303$^b$, in position to contact with the shoulder of a lug or projection 475 upon the adjacent rack plate, the forward end of the detent extending beneath the cam of the adjacent number wheel, and when the said detent is depressed by the rotation of the cam 311 in the direction of its arrow, Fig. 1, the lip 303$^b$ will pass below said lug and the spring 461 will carry the rack plate to the rear and turn the associated pinion one step. These parts are so arranged that the depression of the detent by the cam of one wheel will carry the lip 303ᵇ away from the lug 475 of the rack associated with the wheel of the next higher denomination so that each rack is moved by its spring one step on the completion of the rotation of the wheel of the next lower denomination. When the detent 303 is depressed the pawl I will swing to the rear, bringing its vertical member 304 above a shoulder of the detent which will thus be held in its lower position while the frame G is depressed and the pinions are in engagement with the racks, and to shift the pawls and release the detents 303, the curved members 304ª are so extended forward that on the rising of the frame G, these members will be struck by the frame, swinging the pawls so as to carry the vertical arms 304 away from above the shoulders of the detents 303, which then can rise under action of springs 362. By this means the position of the pawls is controlled in one direction directly by the movements of the frame G. The movement of each pawl in the opposite direction is effected by the spring 362 which also lifts the detent 303, the said spring being connected at its upper end to the member 304ª of the pawl so that each spring 362 performs two offices.

The lugs 475 must be of hard material in order to resist the effects of wear and have heretofore been made in the form of studs which if hardened to a desirable extent are difficult to rivet in place, and if sufficiently soft to rivet will wear too rapidly. The said lugs are therefore made in the form of L-shaped blocks, Fig. 9, which may be hardened to any desired extent and are perforated for the reception of rivets of suitable soft material which by them are secured to the rack plates. This affords a means of exactly determining the degree of movement of each plate as the notch or shoulder of each block constituting the lug 475 is made of precisely the depth required to secure the proper limit of movement.

In order to properly hold down the rack plates and their associated blades as well as to guide the same I provide each rack plate at opposite sides with rollers 453, Figs. 9 and 11, which rest on a properly finished face of the bed plate, and to the latter and between the different rack plates, I bolt guide strips 975, each with two side flanges 977 which overhang the adjacent rollers and serve to prevent them from rising vertically, without interfering with their proper longitudinal movements back and forth.

*The key section.*—The key section consists of series of numbered keys and a detachable supporting frame consisting of front, back and side plates and the upper plate 201, Figs. 1 and 2, and key plate 201ª, the key stems 202 extending through openings in said plates, and each series of stems is in such position that when any one of them is depressed it will extend to one side of one of the blades 404 and limit the forward motion of such blade by contact with a lug 430, Figs. 2, 9, 10, thus determining the extent of movement imparted to the rack plate and to its associated pinion and number wheel, which movement corresponds to the number indicated upon the key, the stem of which is depressed.

Heretofore the lugs 430 have been made in the form of studs which have to be riveted in place in the blades, and to avoid the expense of this construction, as well as the chance of displacement, the lugs are formed by cutting L-shaped slits in the upper edges of the blades, and then bending to opposite sides the alternating portions thus partially cut from the blade to the position shown in Fig. 10.

The blades 404 are pivoted to the lower ends of type carriers shown as levers 403, Figs. 2, 9 and 10, which are swung in one direction by a swinging bail 401 suspended from the shaft 420 of the type levers, the said bail having an anti-friction roller 450 which bears upon the edge of a cam 900, upon the working shaft 922, the upward movement of the cam permitting the bail 401 to swing forward as the roller 450 is engaged by the horn 900ª of the cam, the said forward motion resulting from the action of springs 960, Fig. 2, each connected at its forward end to a fixed point on the frame and at the rear end to one of the blades 404. To facilitate this connection the said blade has an opening 404ᶜ Fig. 9, with an inclined slot 404ᵈ leading to the lower edge of the blade, into which opening is introduced the hooked end of the spring. This facilitates the assembling and disassembling of the parts and secures a sure connection.

To permit the blades 404 to be readily connected with and disconnected from the lower ends of the type levers each of the latter has a shouldered pin or stud 434ª, Figs. 2 and 10, adapted to enter an opening v, Fig. 9, in the end of the blade 404, and to secure the parts in place a latch blade 404ᵍ is pivoted to the blade 404 and has a notch 404ᶠ adapted to enter an annular recess in the stud 434 to hold the stud in the opening v. The shouldered pin may be upon the blade 404, and the opening in the type carrier and the notched latch may be pivoted to either.

In the key section are the total and subtotal keys 702ᴿ and 702ᴸ, the operations of which will hereinafter be described in connection with the recording and operating sections.

*The recording section.*—With the usual type carriers for printing the figures is combined, an extra carrier 403^A, Fig. 4, which carries a series of types having upon them special indicating figures or letters, as "T," "ST.," "E," etc., to show that the associated item is a total or subtotal, or that the amount indicated thereby is eliminated in the accumulator, etc. This carrier receives its movement from a shaft 521, Fig. 4, said shaft having an arm 515$^a$ which is provided with a stud 535$^b$, that enters a slot in an arm of the carrier 403^A, and the rocking of the shaft 521 to different degrees determines which character will be printed with an item. The shaft 521 is provided with an arm 513$^a$, Figs. 2 and 7, which has two inclined faces $u$, $u'$, and a terminal stud 535$^b$. An arm 700$^a$ of the total key lever 700, carries a pin 731$^a$, which acts upon the inclined face $u$, and will swing the arm 513$^a$ and the shaft 521 when the total key is depressed until the pin reaches the end of the face $u$ and is brought opposite a flat face $u^2$, when no further movement is imparted to the shaft 521. This will permit a certain additional movement of the total key without changing the position of the shaft 521 or of the type. In like manner an arm 701$^c$ of the subtotal key lever 701 is provided with a pin 733$^a$, which acts upon the inclined face $u'$ until it reaches the end of the same and passes on to a face $u^3$, and this in like manner lifts the arm 513$^a$ and then permits a slight additional movement of the subtotal key without affecting the position of the shaft 521. The arm 702$^a$ of an eliminating key 702, Figs. 4 and 7, may act upon the stud 535$^b$ to lift the arm 513$^a$ and rock the shaft 521. Either of the aforesaid movements is sufficient to bring the proper type into line.

*The operating section.*—There is a working shaft 922 which is connected to be actuated from an operating rock shaft 1120, Figs. 1, 4, 5, which may be rocked either by an operating handle 1175 connected detachably as hereinafter set forth, or from a motor. The said shaft 1120 is provided with an arm 176 having a pin entering a slot in a connecting rod 1178$^a$ Fig. 5, pivoted at the rear end to a plate 1179$^a$ secured on a counter rock shaft 1121. This shaft 1121 carries also an arm 1179 which is pivoted to a link 1175$^b$ of a toggle, Figs. 1 and 4, the other member 1175$^a$ of which swings upon a shaft 921. The arm 1179 adjacent to the point where it is pivoted to the link 1175$^b$ is connected with the forward end of a heavy spring 1160, Fig. 1, which is connected at the rear end with the pin upon a lever 1103$^r$, which swings loosely on the shaft 1121, and the lower end of which is pivoted to a connecting rod 1178, Figs. 1 and 4, pivoted at its forward end to an arm 905 projecting downward from the working shaft 922. As a result of this arrangement the rocking of the shaft 1120 in the direction of its arrow, Figs. 1 and 5, draws forward the connecting rod or link 1178$^a$ and rocks forward the arm or plate 1179 and tends to extend and place the spring 1160 under such tension as to swing the lever 1103$^r$ in the direction of its arrow Fig. 1, and thereby draws back the link or connecting rod 1178 and rock the shaft 922 in the direction of its arrow to an extent to effect the operations which are the result of the forward stroke of the operating handle, or other actuating means.

On releasing the handle, or permitting the shaft 1120 to rock back, the parts are restored to the position by the action of two springs 1161, Figs. 1 and 2, upon opposite sides of the machine suitably connected at their forward ends to the frame and at their rear ends to links 1166, each of which has a hook at the rear end, one engaging a stud 1136$^c$ upon the lower end of the arm 1179, and the other engaging a stud 1137$^c$ upon the arm 1116, Fig. 2.

A dash-pot 1171 regulates the speed of the reverse motion of the shaft 922 as well as the forward stroke, and it is necessary after the completion of the forward stroke of the handle to maintain the parts in position for a sufficient length of time for the spring 1160 to carry the lever 1103$^r$ to its full extent, and this is effected through the medium of the toggle links 1175$^a$ and 1175$^b$, which when the plate 1179 is carried forward to its full extent take a locking position in line with each other and will prevent the backward rocking of the plate and operation of the connected parts until the lock is broken. The breaking of this lock is effected when the lever 1103$^r$ completes its movement by means of a slotted link 1106 pivoted to the upper end of said plate and receiving into its slot the connecting pin 1135 of the toggles, the slot being of such length that the rear end of the slot on the completion of the forward stroke of the lever 1103$^r$ will strike the connecting pin 1135 and carry it beyond the locking point. A spring 1162, Fig. 1, connected at the forward end to a fixed stud is attached at its rear end to the upper extended arm of the link 1175$^a$ and tends to hold the links in locking position.

*Full stroke device.*—The full stroke device, Fig. 5, consists of a pawl 1177 pivoted between the side frame and a plate 1101 and adapted to engage notches at the upper notched edge of the plate 1179$^a$, the terminal notches being enlarged so as to permit the swing of the pawl to different positions after the plate reaches either terminal position, as is common in this class of devices. The full stroke device of course is essential when the machine is operated as a hand machine, but it is undesirable when the machine is driven by a motor, as the motor itself determines the limits of action and secures a full stroke, and I therefore provide means whereby the actuating pawl 1177 of the full stroke device is thrown out of action when the parts are connected to be driven by power.

Normally the handle 1175 is applied detachably to the end of the shaft 1120, being provided with pins for engaging notches in said shaft, and the said shaft is recessed to receive a plunger 1125, which extends through the shaft and is thrown outward by a spring 1167, Fig. 8, and between the inner end of this plunger and the pawl 1177 are such connections that when the plunger is carried inward the said pawl will be thrown out of operative position.

As shown there is a rock shaft 123 inside and parallel to the right-hand side plate of the machine, which shaft has a pendant L-shaped arm 106 Figs. 5 and 12, in position to be met by a washer 101 carried on the inner end of the plunger, and at the rear end of this shaft 123 is a lateral finger 137 which bears upward upon one arm of a three-armed lever 1109$^a$, the upper notched arm of which bears upon a stud 1132$^a$, carried by a link 1108, pivoted to an arm extending from the pawl 1177. A spring 1162, connected at the forward end to the frame, and at the rear end to the link 1108, tends to hold the stud 1132$^a$ in the notch of the lever 1109$^a$ and to carry the pawl 1177 into operative position, but when the plunger 1125 is forced inward the shaft 123 is rocked, and the finger 137 bearing on the arm of the lever 1109$^a$ rocks the latter in the direction of its arrow Fig. 5 so as to distend the spring 1162 and throw the point of the pawl up out of operative position.

The plunger is set inward on the application of a detachable arm 176, Figs. 5 and 6 which carries a central stud 176$^a$ Fig. 8 projecting inward from the hollow hub of said arm which is applied to the shaft 1120 whenever the machine is to be driven by a motor.

In assembling the parts, or to disconnect them for repairs, one of the first operations is to disconnect the working parts from the shaft 1120, and to facilitate this the link or connecting rod 1178$^a$, Fig. 5, has a slot $x$ which receives the reduced shank of a pin 1130 on the arm 1176 of the operating shaft, and this slot is enlarged at its rear end so as to permit the enlarged head of the pin 1130 to pass through this enlargement and bring the narrow part of the slot in line with the narrow shank of the pin. The link 1178$^a$ is provided with an L-shaped latch 1104 pivoted to the link and normally thrown to the position shown in Fig. 5 by a spring 1165. This brings the forward rounded end of the latch 1104 in a position to resist the normal thrust of the pin 1130 when the operating shaft is swung to carry its arm 1176 backward, but the latch will yield and permit the pin 1130 to pass below it in case of an abnormal thrust, and thus prevent the machine itself from being strained. In order to prevent any possibility of the pin 1130, when the link 1178$^a$ is forward, escaping from the rear enlargement of the slot $x$, the plate 1104 is provided, with a shoulder or projecting portion $y$, which extends across the enlarged portion of the slot and prevents the pin 1130 from being carried the full length of the slot and escaping therefrom. When however it is necessary to connect or disconnect the parts the application of the finger to the rear end of the plate 1104 will tilt it sufficient to carry the projecting portion $y$ away from the slot $x$, and permit the pin 1130 to be passed into or from the enlargement.

The parts just described aid further to form a full stroke device for the total keys, locking the machine from operation unless said keys are at either of their extreme positions. To this end a shaft 926, Figs. 5 and 6, extending across the machine is rocked in the direction of its arrow Fig. 5, upon depressing either key, and on the said shaft is a forked lever 912$^a$, the longer arm carrying at the rear end a roller stud 950 which is opposite the curved edge of one of the lower arms $k$ of the forked lever 1109$^a$. The said parts are so proportioned that when the lever 1109$^a$ is in the dotted position Fig. 5, and the lever 912$^a$ is swung in the reverse direction of the arrow, its stud 950 is carried against an inclined edge $v^3$ of the arm $k$ so as to swing the lever 1109$^a$ slightly in the direction of its arrow and thereby rock the pawl 1177 to a position to present its end opposite a bearing edge $z$ of the plate 1179$^a$, thereby absolutely preventing any movement of the latter, and the parts will be maintained in this position until the roller stud 950 passes away from the upper end of the curved edge $k$, as the total key completes its movement when the lever 1109$^a$ will be carried by the spring 1162 to a position to carry the pawl away from the edge $z$. This results if either of the total keys is depressed.

The above parts will only operate as described when the lever 1109$^a$ and the pawl are in operative relation as required when the parts are actuated by a hand lever; when however the machine is connected with a motor and the pawl is thrown out of operative relation to the plate 1179$^a$ it still is essential that there shall be means for preventing the operation of the machine except when the total keys are at the limits of their movements. This is effected as follows: The shaft 123 is mounted to rock in a bracket 102 at its rear end and at its forward end in a slide 103, Figs. 5 and 6, which slides back and forth upon the frame and is provided with a stop projection d, and the short arm of the lever 912ᵃ extends into an annular groove of the shaft 123 so that on rocking the shaft 926 the shaft 123 will receive a longitudinal movement and this will carry the projection d beneath a stud 134 upon a pivoted starting arm 103ᵃ of the machine. Unless the total keys are in their normal position, or fully depressed, the shaft 926 will be rocked so that the projection d will be below the stud 134, so that the starting arm cannot be depressed, and unless the said keys are moved to their full extent the said projection d will not be carried forward sufficiently to escape the stud 134, and consequently the machine cannot be started except after a complete movement of either of the keys.

While different means may be employed for rocking the shaft 926 to effect the shifting of the full motion pawl, and to lock the starting arm of the motor, I have shown a construction which has proved effective. In this construction the shaft 926, Fig. 7, is provided with two arms 913, 913ᵇ, the former carrying a roller stud 954, and the latter a roller stud 954ᵇ, and also terminating in a hook. The total key lever 700 is an L-shaped lever pivoted upon the shaft 922, and inclined beyond the said shaft to form a forked arm 700ᵇ, the members of the fork receiving between them the stud 954ᵇ. The subtotal key lever 701 is L-shaped and beyond the shaft 922 has three arms 701ᶜ, 701ᵃ and 701ᵇ, the latter having a stud 734ᵃ at one side at its extreme end. When the total key is depressed the forked arm 700ᵇ by its engagement with the stud 954ᵇ raises the arm 913ᵇ and rocks the shaft 926 in the direction of its arrow, and the same result ensues if the subtotal key is depressed, as the latter is provided with a stud 734 at one side extending over the lever 700, and by its contact therewith carries the latter down, but without interfering with the independent depression of the total key when the latter is to be operated.

The shifting of the adder wheels into and out of gear with their racks is effected, by the oscillation of the arm 331 as before described, and this results from the rocking of a plate 707 carrying two dogs 711, 712, as in the aforesaid Pike construction, the direction of movement of the said plate depending upon the contact of a roller 952, Figs. 4 and 7, upon an arm 901 carried by the shaft 922, with one or other of the said dogs, the latter being each connected to a spring which tends to bring each normally against a stop 734ᵉ on the plate. With this plate, and with the connecting blade 714, the movement of which shifts the position of the adder carrier frame G, is combined a reversing device, as a slotted plate or link 710, pivoted between its ends by a pivot 731 to the side frame, the slot in the link receiving a stud 739 on the connecting bar or blade 713 which is pivoted at its rear to an arm of the plate 707. By using a reversing device I am enabled, by shifting the position of the stud to a position above or below the pivot 731, to reverse the rocking action of the plate 707 upon the frame G. The shifting of the position of the stud in the slot is effected from the rocking of the shaft 926, through the medium of a connecting bar 912 pivoted at the lower end to the end of the arm 913, and at the upper end to the blade 713. From this it results that when either total key is depressed to rock the shaft 926 in the direction of its arrow, the connecting bar 912 is lowered, lowering the stud 739 in the slot in the link 710. When the total key is depressed alone the only result is to reverse the action of the link by throwing down the stud 739 to cause the blade 714 to be thrown forward to bring the pinions into engagement with the racks upon the forward stroke. This results from the contact of the roller 952 with the dog 712. On the reverse motion of the shaft 922 the roller 952 hits the top dog 711, the stud 739 still being at the bottom of the slot, and disengages the pinions and the rack at the beginning of the reverse movement of the handle or other operating part. When however the subtotal key is depressed it effects the additional function of throwing the dog 711 out of action. That is, the arm 701ᵃ of the subtotal key, by contact with a stud 738 on the dog 711, tilts the forward end of the dog upward and holds it in this position while the arm 901 swings downward and completes its stroke without contact with the dog 711, so that the plate 707, and the connected parts, remain in position during the return stroke and the pinions remain in mesh with the racks. In accumulating, where the total keys remain in their normal position, the dogs 711, 712 effect the entire operations in connection with the shifting of the pinions into and out of operative connection with the racks, the roller 952 striking first the dog 712 and swinging the plate 707 in one direction, and then on the reverse movement striking the dog 711 and restoring the plate to normal position.

In order to properly lock the total keys so that they cannot be moved after the operation of the rock shaft 922 begins, I provide the said shaft with a curved or hooked arm 901ᵃ, which when the parts are in the normal position shown in Figs. 4 and 7, will, as the shaft 922 starts its movement in the direction of the arrow, swing under the stud 954 on the arm 913, and thus prevent any movement of the arm 913 or of the shaft 926 during the rocking of the shaft 922. If either total key is depressed and the shaft 922 is rocked in the direction of its arrow, the stud 954 is carried below the path of travel of the arm 901$^a$, and after the shaft 922 begins its movement the presence of the arm 901$^a$ above the stud 954 will prevent any reverse rocking of the shaft 926. In like manner when the total key is depressed and the shaft 926 rocked, the hook at the end of the arm 913$^b$ engages the stud 734$^a$ of the subtotal key and will lock the latter in upper normal position until the rock shaft is restored to its normal position, and also should the subtotal key be depressed, thereby depressing the total key, the hook on arm 913$^b$ will assume a position below the stud 734$^a$ on subtotal key and lock the latter down. If it be assumed, which is almost impossible in the construction shown, that by any mal-adjustment the end of the arm 901$^a$ is brought against the side of the stud 954, so as to prevent the further rocking of the shaft 922, this will not result (in the case of the machine being driven by power) in the arrest of the motor or interference with the parts moved thereby, because the working shaft 922 is, as before described, yieldingly connected with the operating shaft which may continue its movements. The arrangement therefore of the locking device in connection with the working shaft is one which under some possible circumstances would prevent the breaking of the machine or the burning out of the motor.

The eliminating key 702 is pivoted to the side frame and has an extended arm 702$^b$, which is in such position that by swinging the upper end of the eliminating key forward the rear end of the said arm will come in contact with the prolongation of the stud 738 and will shift the dog 711 out of position to engage the stud 952. As a result, after thus setting the eliminating key, when the shaft 922 rocks on the forward movement of the hand lever, or other operating device, the contact of the stud 952 with the dog 712 will rock the plate 707 and carry back the blade 714 so that the frame G will rise and the pinions will be carried out of engagement with the racks, and on the downward movement of the stud 952 (the eliminating key holding the dog 711 out of position) the plate 707 will not be disturbed and the pinions will remain out of engagement with the racks during the return movement of the handle. The eliminating key is so supported that it can be shifted at any period of the operation of the machine. This permits the dog 711 to be put out of operative position at any time prior to the return stroke. Therefore if the operator in operating the machine by hand to accumulate items should partially draw forward the operating handle and then discover that he has set the numeral keys improperly, he can, by shifting the eliminating key to position to throw the dog 711 out of operation, prevent the accumulation of the amount improperly set upon the accumulating devices, and it is simply necessary to erase it from the record. It is desirable however to avoid the necessity of the operator maintaining his hand upon the eliminating key if he has set it to disable the dog 711, and means are therefore provided whereby the said key when so set is locked, and automatically disengaged upon the return action of the machine. To effect this the eliminating key is provided with a pivoted catch plate 703 having a shoulder to engage a stud 938$^d$ upon the side frame when the upper end of the key is pulled forward. To the same pivot to which the catch plate is pivoted, is hung a latch 704 having a lateral lip 704$^c$ which is held in engagement with the lower edge of the catch plate by a spring 764. This latch is in position to be struck by an arm 901$^b$ Fig. 2 on the rock shaft 922, and on the forward movement of said arm the latch will swing with the arm until the latter escapes from it; on the backward movement however the arm 901$^b$ will engage the latch and the lip of the latch will be brought against the lower edge of the catch plate and will swing the latter upward until its shoulder is released from the stud 938$^d$, when a spring 762, connected to a stud on the frame and to the eliminating key, will swing the latter in the direction of its arrow to its normal position.

Any suitable means may be employed for starting the motor on depressing the starting arm 103$^a$. As shown Fig. 5 a pawl 107 is pivoted to and swings below the arm 103$^a$ in position to contact with the lip on one arm of a contact device J shown as a bell-crank lever 108, pivoted to the base frame of the machine, the other arm extending into a position to make contact with a stud 138$^a$ upon a slide 111$^c$ which is connected with a pawl 110$^c$ of a clutch of any suitable construction, which is the means of connecting the motor shaft 120 to the actuating rock shaft 1120, the crank arm 176$^a$ on said motor shaft being connected by a chain 191 with the arm 176 upon the actuating shaft 1120. By this arrangement, on depressing the starting arm 103$^a$, the contact of the pawl 107 with the lever 108 will rock the latter and bring its lower end in contact with the stud 138$^a$ and shift the slide so as to actuate the pawl 110$^c$ and shift the clutch to a position to start the machine, the clutch being of a character to be automatically released on the completion of one rotation of the shaft 120. It is however sometimes required to maintain the rotation of the shaft 120 in order that the machine may automatically repeat its operations until arrested, and I therefore combine with the starting arm means for keeping the bell crank 108 depressed at the will of the operator.

In order to stop the motor at the end of each rotation it is necessary that the contact device J shall be released prior to such rotation being completed, and this I effect by combining with the pawl 107 a means for shifting the latter as the shaft 1120 reaches the limit of its forward throw. Thus a slide 104 is carried at one end by a stud 156 on the starting bar 103$^a$, which stud extends through the slot in the slide which is connected at the other end by a stud 133 to the pawl 107, a spring 160$^a$ swinging the latter so as to carry the slide backward to the extent permitted by a lug 133$^c$ on the starting arm with which the stud 133 contacts. The slide is in position to be struck by the upper end of the arm 1176, or the stud 1130 thereof, as the shaft 1120 completes its forward swing so that the bar 107 is thereby shifted to release the bell crank 108.

By shifting the slide 104 to a non-contacting position with the arm on the shaft 1120, the aforesaid action by the latter is prevented, and to maintain the pawl 107 or carry it from proper position to maintain contact with the bell crank 108, the slide 104 is provided with two openings either of which may receive the stud 133, the rear opening 104$^a$ receiving said stud when the slide is shifted and set forward so as not to be actuated by the arm of the shaft 1120, when the machine will be operated by the motor as long as the starting bar is held in its lower or starting position.

In the claims of this specification, the bar 103$^a$, or any equivalent device, which is manipulated by the person using the machine to effect or permit actuation of the mechanism by the motor is referred to as "the starting device" as it is the member by which the operator controls the time when operation of the machine shall take place.

It will be seen that the contact device J of the adding machine, while in position to make contact with a device which will when shifted start the motor, is not connected with said device and consequently the machine may be at once brought into operative relation to the motor by merely placing it on the table, and may be removed from the table without breaking any positive connections.

I do not here claim any of the features shown and connected with the table and motor as these constitute the subject of a separate application for Letters Patent.

The type carriers are combined with detents 503, Fig. 1, shifted by studs 435 on the type carriers, and each provided with a lip or tail 503$^c$ for shifting the next lower detent as usual, but the detent associated with the carrier next the detent of the special type carrier 403$^a$ has no such lip and does not act on such last-named detent, which is always released on the initial movement of the associated or special character type carrier as it is sometimes desirable to print a special character, when the adjacent type carrier is moved but one step to bring a cipher into position, such for instance as a "clear" signal.

When the machine is operated very rapidly so that the studs 435 strike the inclines $s$ at a high speed, the detents 503 are thrown entirely away from the tails of the hammers instead of having only a limited movement, as should be the case, and consequently when the blade 569 is raised the hammer at once drops, instead of being retained to be released by the further movement of the detent. To prevent this the buffer rod 527 is used which is brought against the edges of the detents under the action of springs 568 connected to the ends of the rod. When the detent tends to move beyond the point to which it should normally be arrested under the action of the stud 435 the springs prevent such movement. That is, the detent meets this buffer rod and the springs resist its throw and tend to keep it from overthrowing. When a shifter blade 514$^a$ carried by arms 517$^a$ acts upon the edges $t$ of the detents the force applied is sufficient to overcome the force of the springs connected with the buffer rod and shift the detents to release the hammers.

When the blade 569 is raised the hammers 501 are unlocked and tend to turn on their pivots under the influence of their springs 561, but at this time the tails of the hammers come in contact with the detents 503 and are held against operation until those detents are moved by blade 514$^a$. The surface of the detent 503 which makes contact with the tail of the hammer is formed with a long cam face $b$ so shaped that the tail of the hammer will in turning under the influence of its spring 561 cam down the detent 503, against the action of its spring 564. This not only gives a downward movement to the edge $t$ bringing it into position to be engaged by the blade, and thus furnishes a wider working margin, but also performs part of the work which would otherwise be performed by stud 435 in engagement with the surface $s$. Since by this arrangement the studs 435 on the type carriers 403 perform less work in actuating the detents it is not necessary to have the springs 960 which operate the type carriers as strong or heavy as would otherwise be necessary.

It will be observed by reference to Figs.

1 and 13 that the shifter blade 514ª is carried by two swinging arms 517ª adjacent the side plates 500 of the recording section C and secured to said plates by studs 531ᴮ thus forming a bail. There are frictional washers on the studs 531ᴮ whereby the arms 517ª and blade 514ª are maintained in any position to which they may be actuated. The blade 514ª is moved forward against surface $t$ to trip the detent 503 so that the hammer 501 will fall by the cam 900 which rotates until its point F engages the blade and moves it. When thus moved the blade remains in its forward position until the parts of the machine almost reach their normal rearward position, being held by the friction bearings on studs 531ᴮ. The blade is restored to normal position by an arm 518ᴬ which engages a stud 530 on the left arm 517ª and which arm 518ᴬ turns in an anti-clockwise direction as the machine returns to normal position. It will be seen by reference to Figs. 2 and 13 that the arm 518ᴬ is mounted on one end of a shaft which carries at its other end the bell crank 510ᴬ which is rocked by link 505ᴬ—that is, suitably connected with the arm 1116 on the counter-shaft 1121 so as to be positively moved thereby.

It will be seen by reference to Fig. 1 that blade 514ª is normally below the edge $t$ of the detent 503 and that if the blade is moved forward before the detent is cammed down it will assume a position beneath the end of the detent instead of striking the surface $t$, and will prevent its downward motion. This is important since it serves to prevent the type carriers or sectors 403 from "slamming out" where a blank total taking operation is performed. It is customary to take a blank total or print a clear signal at the head of the list, but since in taking a total the blades 404, which are connected to the type carriers, are released so as to move under the influence of their springs 960, the type carriers would naturally be thrown out to the ninth position or the end of their stroke. This would be objectionable since it would not only confuse the operator, but injure the machine. My means above described prevents this slamming out of the type carriers since the stud 435 cannot pass the incline $s$ on the detent 503, and therefore the carriers cannot move to their end positions. In taking any total the detents corresponding to keys on the key board which have not been actuated or rather to denominations higher than the total to be printed, will not have been cammed down into the path of the tripping blade 514ª and will therefore be locked.

Before taking a total it is necessary to bring the adder racks and associated detents to normal position, and in the class of machine represented an extra or idle stroke of the handle or swing of the working shaft is required for this purpose after printing the last of the number of items to be added. It is therefore important to prevent either total key from being depressed or the actuating of the working shaft if pressure is put on either key. I therefore provide a stop device which is shifted into position after printing an item to prevent the depression of either total key, together with means which permits the total keys to be shifted to a certain extent to lock the working shaft and prevent any operation of the machine if an attempt is made to operate the total keys immediately after printing an item, the stop device and locking means however being shifted out of stop position upon any swing of the working shaft when no numeral key has been depressed.

While the stop devices and its adjuncts may be variously constructed, I have shown it as a horizontal plate 509 pivoted to the frame and having a tail 509ª, a notch 509ᵇ, an inclined edge 509ˢ, and upwardly projecting lug 509ᶜ.

A rock-shaft 527ᴬ mounted in the side plates 500 of the recorder carries two arms 515, 514, the former in position to strike the end of the tail 509ª when the plate is in the position shown in Fig. 16, and the arm 514 is connected by a link 512 with an arm 913ª on the lower rock-shaft 926, Fig. 2.

The lock plate is combined with any part movable from the working shaft which will shift the plate out of a stop position upon rocking said shaft, a spring 508ᵇ tending to carry the plate to stop position. In the construction of apparatus shown there is a sliding bar 506ᵇ which is carried in the direction of its arrow Fig. 16 at each oscillation of the rock-shaft, and upon this bar I arrange a lug 506ᶜ in position to make contact with the lug 509ᶜ of the stop plate so as to shift the latter at each swing of the working shaft to the position shown in Fig. 15. The bar 506ᵇ is mounted in the side plates 500 of the recorder frame and connected through the bell crank lever 506ᵈ with a link 516 in substantially the same manner that somewhat similar parts are connected in the patent to Pentecost, 912,162. At its lower end the link 516 is connected with an arm of the bell crank 510ᴬ which as shown in Fig. 2 is connected with the counter-shaft 1121 by means including the link 505ᴬ. With these parts is combined a movable detent, the position of which depends upon whether the operation of the working shaft results in accumulating an item. Thus an arm 501ª on or connected to swing with the hammer coacting with the units type carrier is carried forward as the hammer assumes a normal position after accumulating and printing, and, if the lock plate is in the position shown in Fig. 15, enters the slot thereof and holds the plate in such position, but when the lock plate is in the position shown in Fig. 16 the arm 501ᵃ is at the side of the plate and thus locks it in the latter position. These parts are so arranged that when the total key is depressed, or on depressing the subtotal key (which carries the total key with it) the rocking of the shaft 926 will swing the shaft 527ᴬ and carry back the arm 515. On printing or accumulating an item, however small, the units hammer will swing back and on returning to forward normal position will carry its arm 501ᵃ to the side of the lock plate. It will be evident that if now any attempt is made to depress either total key the arm 515 will be carried against the tail of the lock plate (now in the position Fig. 16) and prevent such depression. If now the handle is pulled, or the starting bar depressed, the working shaft will be rocked, the bar 506ᵇ will move to the left Fig. 16, and by the contact of the lug 506ᶜ with the lock plate will swing it to the position shown in Fig. 15, the inclined edge 509ˢ sliding up over the inclined end of the arm 501ᵃ so that as the plate takes the position Fig. 13 the arm will be in the slot and hold the plate in position against the stress of the spring.

If now it is desired to print an item, the depressing of any numeral will result in a forward throw of the units hammer when the working shaft is rocked and the arm 501ᵃ will move back and the lock plate will be released and swung to the position Fig. 16, and every time the working shaft is rocked while a numeral key is depressed the arm 501ᵃ will be carried back and before it returns the plate will assume the position Fig. 16 so that after printing any item the lock plate will obstruct the movement of the total keys. If however the working shaft is rocked when any numeral key is depressed, that is if an idle stroke is taken, no hammer will be shifted, the arm 501ᵃ will remain in normal position and lock the plate when the latter reaches the position shown in Fig. 15, and then the tail of the plate being out of the way of the arm 515 the total keys can be freely operated. It will be seen that when the lock plate is in locking position, Fig. 16, the arm 515 is not in absolute contact with the tail and this permits a limited movement of the total key and secures a slight rocking of the shaft 926, sufficient to bring the dog 1177 opposite the face z of the plate 1179ᵃ (Fig. 5) and lock the machine, or if the machine is power driven the partial rocking of the shaft 926 will shift the block d to position to lock the starting bar 103ᵃ as before described.

It will be seen that the springs 1161 are extended for about one-half the length of the machine base and that being arranged at the side of the machine they can be much larger than a series of springs arranged at the rear, as heretofore. By increasing the length and size of the springs there is secured a softer action, the proper resistance being attained with a comparatively small extension of the spring in proportion to its length and there is a more uniform pull than could otherwise be secured. This also permits the proper spring action to be attained by the use of two springs only, reducing the number of parts and the cost of construction and assembling.

Without limiting myself to the construction shown, I claim:

1. The combination with the shiftable adder wheel frame, the wheels and pinions mounted in said frame, rack supporting blades, racks movable thereon, and detents adapted to engage said racks, of pivotally mounted pawls each adapted to be adjusted to engage a detent to hold it in inoperative position while the adder wheel frame is in position to engage the pinions and racks and to be disengaged from said detent when the adder wheel frame is moved to carry the pinions away from the racks.

2. The combination with the adder wheel frame, its adder wheels and pinions, the sliding blades and racks movable thereon and provided with lugs and with detents engaging said lugs, of suspended pawls each with a vertical member engaging one of the detents, and an inclined member extending over the adder wheel frame.

3. The combination with the adder wheel frame, its adder wheels and pinions, the sliding blades and racks movable thereon and provided with lugs and with detents engaging said lugs, of suspended pawls each consisting of a narrow blade with side trunnions bent to form a vertical member engaging one of the detents, and an inclined member extending over the adder wheel frame.

4. The combination with the adder wheel frame, its adder wheels and pinions, the sliding blades and racks movable thereon and provided with lugs and with detents engaging said lugs, of partition plates between the different blades and wheels, and pawls suspended to swing between said plates and each having a member for engaging one of the detents and another member for engaging the wheel frame.

5. The combination with the adder wheel frame, its adder wheels and pinions, the sliding blades and racks movable thereon and provided with lugs and with detents engaging said lugs, of pawls engaging said detents and extended to contact with and be shifted in one direction by the adder wheel frame, and springs for carrying the pawls in the other direction.

6. The combination with the adder wheel frame, its adder wheels and pinions, the sliding blades and racks movable thereon and provided with lugs and with detents engaging said lugs, of pawls engaging said detents and extended to contact with and be shifted in one direction by the adder wheel frame, and springs for carrying the pawls in the other direction, said springs connected to move the detents.

7. The combination with the reciprocating blades 404 and racks carried thereby and the detents 303, of lugs on the racks, each consisting of a block of hard material connected to the rack.

8. The combination with the reciprocating blades 404 and racks carried thereby and the detents 303, of lugs on the racks each consisting of a block of hard material provided with a shoulder adapted to engage the detents as set forth.

9. The combination with the series of reciprocating blades 404, of intermediate guide strips provided with side flanges, and rollers at the sides of the blades below said flanges.

10. The combination with a type carrier and a blade 404, of a shouldered pin on one and a recess receiving the pin in the other, and a latch pivoted to one or the other notched to receive the shank of the pin as set forth.

11. The combination in an adding machine of a series of type carriers supporting figure type, a supplemental carrier provided with a plurality of character type, a rock shaft and means for rocking it to different degrees, and an arm on the rock shaft arranged to engage the supplemental carrier.

12. The combination with the figure type carriers and accumulating devices and actuating means of an adding machine and with a plurality of keys whereby to vary the operations of said carriers and devices, of a supplemental carrier provided with a plurality of type of different characters, a rock shaft and means for shifting the supplemental type carrier therefrom, an arm on said shaft provided with inclined bearing edges, swinging arms with pins engaging said edges and means for swinging said arms by the shifting of the said keys.

13. The combination with the supplemental type carrier having a plurality of type of different characters, and with a rock shaft and means for swinging said carrier therefrom, of an arm on said shaft having inclined bearing edges.

14. The combination with the supplemental type carrier having a plurality of type of different characters, and with a rock shaft and means for swinging said carrier therefrom, of an arm on said shaft having inclined bearing edges, and arms with pins coacting with said edges, and a plurality of keys for shifting said arms.

15. The combination with the supplemental type carrier having a plurality of type of different characters, and with a rock shaft and means for swinging said carrier therefrom, of an arm on said shaft having inclined bearing edges, arms with pins coacting with said edges, and a plurality of keys for shifting said arms, each of said bearing edges having two parts, and the terminal parts thereof being at such an angle to the other parts as to permit the movement of the pins without imparting any movement to the arm.

16. The combination in an adding machine, of a frame, accumulating wheels, recording devices, a rock shaft adapted to actuate said wheels and recording devices, and having arms projecting therefrom, and keys controlling movement of said wheels and devices, of side springs connected at their forward ends with the machine frame and at their rear ends to the arms of the rock shaft.

17. The combination with the operating shaft of an adding machine, and a full-stroke device adapted to coöperate with said shaft, of a plunger longitudinally movable in said shaft and connections between the plunger and the full-stroke device for shifting parts of the latter to inoperative position when the plunger is moved inward.

18. The combination with the operating shaft of an adding machine, and a full-stroke device adapted to coöperate with said shaft, of a plunger longitudinally movable in said shaft, and connections between the plunger and the full-stroke device for shifting parts of the latter to inoperative position when the plunger is moved inward, and an arm adapted for attachment to the shaft and for connection with a motor and provided with a bearing for contacting with and shifting said plunger.

19. The combination with the operating shaft of an adding machine, and a full-stroke device adapted to coöperate with said shaft, of a plunger longitudinally movable in said shaft, a rock-shaft provided with an arm arranged opposite the inner end of the plunger, and connections between said rock-shaft and the full-stroke device.

20. The combination in an adding machine of a full-stroke device having a notched plate and a swinging pawl, the operating shaft of the machine and an arm adapted for application thereto, a plunger sliding in said shaft in position to be pushed inward on the application of the arm, and devices between the plunger and pawl for shifting the latter away from the plate when the plunger is carried inward.

21. The combination with an operating shaft and a working shaft each provided with a projecting arm, of a link pivoted at one end to one of said arms and having adjacent its other end a slot enlarged at one end, a pin on the arm of the other shaft having a shank adapted to the narrow portion, a head adapted to the enlarged portion of the slot, and a latch pivoted to the link with an end bearing for said pin, and a shoulder arranged to extend across the slot when the latch is in normal position, and a spring connected to carry the latch to such position.

22. The combination with the full-stroke device of an adding machine, and with the total keys thereof, of means for locking said device on depressing either key.

23. The combination in an adding machine of total keys, a full-stroke device having a notched plate and swinging pawl, and connections between said pawl and each key whereby to set the pawl into locking relation to the plate on depressing either key.

24. The combination with the full-stroke device of an adding machine, of a rock shaft and connections for shifting said device to operative and inoperative positions, and total keys and connections whereby to rock said shaft from the movements of said keys for the purpose set forth.

25. The combination in an adding machine and a motor therefor and with means for starting and stopping the machine, of total keys, a rock-shaft and connections for rocking the same and means operable from said shaft for locking said means on shifting either key from either of its extreme positions.

26. The combination in an adding machine of total keys, a working shaft and full-stroke device having a pawl and notched plate, and means for swinging the pawl in position to engage and lock said plate on moving either key from either of its extreme positions.

27. The combination in an adding machine, of a movable adder wheel supporting frame, a rock shaft, and connections comprising two links, connected respectively with said frame and shaft, and intermediate means for reversing the movement normally imparted to the frame from the shaft through said links.

28. The combination in an adding machine of a movable adder wheel supporting frame, a rock-shaft, and connections between said shaft and said frame for shifting the latter, said connections including a slotted link pivoted midway of its ends and connected at one end with means to swing the frame, and a reciprocating bar provided with a stud extending into the slot of the link with means for adjusting said bar to carry the stud up and down said slot.

29. The combination in an adding machine of a movable adder wheel supporting frame, a rock-shaft, connections between said shaft and said frame for shifting the latter, said connections including a slotted link pivoted midway of its ends and connected at one end with means to swing the frame, and a reciprocating bar provided with a stud extending into the slot of the link, total keys, and means for shifting the said bar to different positions from the adjustment of said keys.

30. The combination in an adding machine and with the movable adder wheel frame, and the plate 707, its dogs 711, 712, of a working shaft, an arm thereon adapted to engage said dogs to rock said plate, a reversing device between said plate and said frame, total keys, and means for controlling said device from said keys.

31. The combination in an adding machine and with the movable adder wheel frame, and the plate 707, its dogs 711, 712, of a working shaft, an arm thereon adapted to engage said dogs to rock said plate, a bar connected at one end with said plate and provided at the other with a stud, a pivoted link connected with said frame and with a slot receiving said stud, total keys, and means for shifting said bar from each key.

32. The combination with the movable adder wheel frame and with the oscillating plate 700 and its dogs 711, 712, of an adder machine, of connections between said plate and frame consisting of a link pivoted midway of its ends, connected at one end with means to shift the frame, and a bar pivoted to the plate and carrying a stud extending into the slot of the link.

33. The combination with a movable adder wheel frame and with the oscillating plate 700 and its dogs 711, 712, of an adder machine, of connections between said plate and frame consisting of a link pivoted midway of its ends, connected at one end with means to shift the frame, a bar pivoted to the plate and carrying a stud extending into the slot of the link, and total keys, and means for adjusting the bar therefrom to carry the stud in the slot to opposite sides of the pivot.

34. The combination with the rock-shaft 926 and total keys and means for rocking said shaft from said keys, of an arm extending from said shaft and provided with a stud, a working rock-shaft and a hooked arm on the latter adapted to engage said stud as set forth.

35. The combination with the movable adder wheel frame and oscillating plate 707, dogs 711, 712 and connections, a rock-shaft and arm for engaging said dogs, of an eliminating key, and means for shifting the dog 711 from said key.

36. The combination with the movable adder wheel frame and oscillating plate 707, dogs 711, 712 and connections, a rock-shaft and arms for engaging said dogs, of an eliminating key having an arm extended to engage the dog 711.

37. The combination with the movable adder wheel frame and oscillating plate 707, dogs 711, 712 and connections, and rock shaft and arm for engaging said dogs, of an eliminating key having an arm extended to engage the dog 711 when in any position to which it is carried by the oscillation of the plate.

38. The combination with the movable adder wheel frame and oscillating plate 707, dogs 711, 712 and connections, and rock shaft and arm for engaging said dogs, of an eliminating key, and means for shifting the dog 711 from said key, with the plate 707 in any position.

39. The combination with the eliminating key of an adding machine, of means for locking the key in position before starting the machine, and means for thereafter automatically unlocking the key during the operation of the machine.

40. The combination with the frame and starting device of an adding machine, of a contact device adjustable from the starting device, and in position to contact with a device connected to start a motor.

41. The combination with the starting device of an adding machine and with a contact movable from the starting device to a position to start a motor, of means for maintaining the contact device in starting position at the will of the operator.

42. The combination with the starting device of an adding machine and with a contact movable from the starting device to a position to start a motor, of means for restoring the contact device to normal position automatically, after each adding operation.

43. The combination with the type carriers and hammers, and hammer detents of an adding machine, constructed to permit a limited movement of the hammers on partial movements of the detents, of means for preventing said detents from exceeding said partial movements, and means for thereafter fully moving the detents to release the hammers.

44. The combination with the type carriers and hammers, and hammer detents of an adding machine, constructed to permit a limited movement of the hammers on partial movements of the detents, of a buffer device for preventing said detents from exceeding said partial movements, and means for thereafter fully moving the detents to release the hammers.

45. The combination with the type carriers and hammers, and hammer detents of an adding machine, constructed to permit a limited movement of the hammers on partial movements of the detents, of a cross-bar and connected springs for preventing said detents from exceeding said partial movements, and means for thereafter fully moving the detents to release the hammers.

46. The combination with the adding and totaling mechanisms and actuating devices of an adding machine, of a locking mechanism, means for setting the latter in position to prevent the total mechanism from being operated to take a total after an item is accumulated, and means for shifting the locking mechanism to permit the operation of the totaling mechanism whenever the actuating devices of the machine are operated without accumulating an item.

47. The combination with the adding and totaling means and keys and actuating devices of an adding machine, of lock devices movable into and out of positions to obstruct totaling operations, and means for shifting said lock devices into obstructing position on accumulating an item and for reversing the position of the locking devices on moving the actuating devices without accumulating.

48. The combination with the hammer, total keys and actuating means of an adding machine, of a movable stop device, a contact device movable from said total keys and arranged to engage the stop device in one of its positions, the hammer and stop device constructed to lock the stop device in one position after accumulating operation and in another position after a movement of the actuating means without accumulating.

49. The combination with the total keys and accumulating means of an adding machine, of a pivoted plate, means for swinging said plate from the actuating means at each movement thereof, a rock-shaft provided with an arm for engaging said plate in one of its positions, and means for rocking said shaft from the said keys, and a units hammer arranged to engage and lock the said plate in different positions.

50. The combination with the total keys, accumulating devices and actuating means of an adding machine, of a locking device for locking the said actuating means, and connections for shifting said device from said keys, and means adjustable to a position to limit the movement of the said keys after an item has been recorded.

51. In an adding machine, the combination with adjustable type carriers, of detents normally permitting a uniform limited movement of all the type carriers, means for adjusting any of the detents independently to permit varying increased movements of the associated type carriers, and means for locking in normal position detents not adjusted by the last said means.

52. In an adding machine, the combination with a series of movable type carriers, a hammer coöperating with each type carrier, a detent adapted to restrain movement of each hammer toward its associated type carrier and to normally limit the movement of the type carrier to the extent necessary to position the zero type beneath the hammer, the detents being individually movable to permit further movement of the type carriers, and means for positively locking the detents in their normal position for the purpose described.

53. In an adding machine, the combination with accumulating devices and recording devices including a movable type carrier, and a hammer coöperating therewith, of a hammer controlling detent normally limiting movement of the type carrier relative to the hammer and adjustable to permit more extended movement of said carrier to record an item or the total of items previously accumulated, and means for locking the detent in its normal position when the machine is actuated as in taking a total with the accumulating devices in zero position.

54. In an adding machine, the combination with type carriers, of means for actuating said carriers to take a total, and means for preventing a full stroke of the carriers not used in printing the total.

55. The combination with the type carriers of an adding machine, of detents adapted to be engaged and operated by said carriers in making a full stroke, means for taking a total, and means for locking the detents coöperating with those carriers not used in printing the total.

56. The combination with the type carriers and hammers of an adding machine, of spring-pressed detents for retaining said hammers in inoperative position, cam connection between said detents and hammers whereby the detents are moved toward release position by said hammers, and means for tripping the detents.

57. The combination with the type carriers and hammers of an adding machine, of spring-pressed detents having inclined cam shoulders adapted to be engaged by the tails of said hammers to turn said detents toward release position, and means for tripping said detents.

58. The combination with the type carriers and hammers of an adding machine, of detents for said hammers, means for tripping said detents, means for moving said detents by the hammers toward release position and into operative relation to the tripping means.

59. The combination with the type carriers and hammers of an adding machine, of detents for said hammers, a movable blade for tripping said detents, and cam connection between said detents and hammers for assisting in moving said detents toward release position and into operative relation to said tripping blade.

60. The combination with the type carriers and hammers of an adding machine, of detents for said hammers, a movable blade for tripping said detents having a friction support which maintains it in any actuated position, and means for operating said blade to trip the detents.

61. The combination with the type carriers and hammers of an adding machine, of detents for said hammers, a movable blade for tripping said detents mounted upon swinging arms having friction bearings which maintain them in any actuated position, and means for operating said blade to trip the detents.

62. The combination with the type carriers and hammers of an adding machine, of detents for said hammers, a movable blade for tripping said detents having a friction support which maintains it in any actuated position, means for bringing the detents corresponding to the numbers actuated on the key board into position to be tripped by said blade, and means for moving said blade to trip the above mentioned detents and to lock the remaining detents.

63. In an adding machine, the combination with accumulating devices and recording devices including a movable type carrier and a hammer coöperating therewith, of means normally limiting the movement of the type carrier relative to the hammer to the extent necessary to position the zero type beneath the hammer, said detent being adjustable to permit more extended movement of the carrier to enable an item or total to be recorded, and means for locking the detent in its normal position when the machine is actuated as in taking a total with the accumulating devices in zero position.

In testimony whereof I affix my signature in presence of two witnesses.

CLYDE E. W. GARDNER.

Witnesses:
  ALVAN MACAULEY,
  R. S. MIELERT.